United States Patent [19]

Cagliero

[11] 4,120,977

[45] Oct. 17, 1978

[54] METHOD OF AND FEED FOR FARMING MEAT POULTRY ESPECIALLY CHICKENS AND GUINEA FOWL

[75] Inventor: Germano Cagliero, Ivrea (Turin), Italy

[73] Assignee: Marxer, S.p.A., Loranze d'Ivrea, Italy

[21] Appl. No.: 785,457

[22] Filed: Apr. 7, 1977

[30] Foreign Application Priority Data

Apr. 23, 1976 [IT] Italy .............................. 67988 A/76

[51] Int. Cl.² .............................................. A23K 1/17
[52] U.S. Cl. ...................................... 424/285; 426/2; 426/807

[58] Field of Search .................. 426/2, 623, 630, 635, 426/807; 424/285; 542/408

[56] References Cited

U.S. PATENT DOCUMENTS 3,773,943  11/1973  Welch .................................. 424/285

FOREIGN PATENT DOCUMENTS 1,427M  8/1962  France ..................................... 424/285

*Primary Examiner*—R. B. Penland
*Attorney, Agent, or Firm*—Biebel, French & Nauman

[57] ABSTRACT

Healthy poultry is systematically nourished with a feed containing 10 to 25 ppm nifuroxazide. Proportions of about 15 ppm and 20 ppm, respectively, are recommended for broilers and guinea fowl.

6 Claims, No Drawings

METHOD OF AND FEED FOR FARMING MEAT POULTRY ESPECIALLY CHICKENS AND GUINEA FOWL

CROSS-REFERENCE TO RELATED APPLICATIONS

Cross-reference is made to related applications Ser. No. 785,458; 785,459; and 785,515; all filed concurrently herewith in the name of the same inventor and all concurrently assigned.

This invention concerns the farming of meat poultry and the main object of the present invention is to increase the meat yield and to reduce the feed consumption.

The idea underlying the present invention consists in the use of nifuroxazide as auxinic. In particular the object of the present invention is a method of meat poultry-farming characterized by nourishing healthy poultry with a feed containing from 10 to 25 ppm of nifuoroxazide. In the case of chickens (broilers) the proportion of nifuroxazide is preferably about 15 ppm, while in guinea fowl-farming the proportion is preferably about 20 ppm.

One object of the present invention consists also in a feed for meat poultryfarming, characterized in that the feed contains from 10 to 25 ppm nifuroxazide substantially uniformly dispersed therein. In the case of broilers and guinea fowl the proportions are preferably about 15 ppm and about 20 ppm respectively.

Nifuroxazide, also known as 5'-nitrofurfurylidene-4-hydroxybenzohydrazide presents the chemical formula:

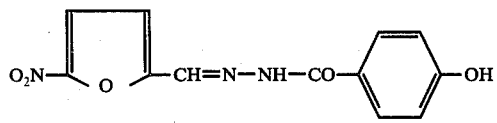

The substance is a microcrystalline, odorless, tasteless, lemon-yellow colored powder, M.P. 296°–299° C. (with decomposition). It is insoluble in water, ethyl ether and chloroform, soluble in dimethylformamide, scantly soluble in 95% ethanol, in methanol, acetone and ethyl acetate. It is a furan derivative. Furan derivatives find application in veterinary medicine. In particular, according to some studies, it seems that meat poultry affected by diarrhea can be cured with relatively high doses of nifuroxazide amounting to at least 600 ppm and normally ranging around 800 ppm (as referred to the feed).

(In the present specification, parts and percentages are intended by weight, unless they are expressly indicated differently).

The therapy consists in administering to the poultry for a few days during illness a feed containing the hereinbefore indicated doses of nifuroxazide.

The present invention is based on the discovery that nifuroxazide acts as auxinic when it is administered to poultry in small doses, as hereinbefore indicated, about 30 times smaller than the antidiarrheic doses, practically for the whole farming period or at least for the larger part of it. It is not a cure for sick animals affected by diarrhea but rather a systematic nourishing of wholesome animals.

An extremely important advantage of nifuroxazide consists in the fact that if administered orally, this substance does not present any possibility of absorption, is deprived of acute or chronic toxicity and of teratogenous activity even if administered in doses twice as great as the therapeutical doses.

BROILER-FARMING

The test has been performed on 4,000 one-day old chickens of the White Mountain × Hubbard stock, all males and divided into four groups of 1,000 subjects each, denoted hereinafter by numerals from 1 to 4. The farming performed with the "on the ground" system in uniform surrounding conditions for all the subjects, lasted 70 days.

All the animals were fed in the first 45 days (1.st period) and in the 25 subsequent days (2.nd period) respectively with two compounded integrated feeds, whose compositions are indicated in Table 1. The chemical analysis of the two feeds is indicated in Table 2.

TABLE 1

| Ingredients | 1.st period | 2.nd period |
|---|---|---|
| Soy flour | 13 | 7 |
| Peanut flour | 5 | 4 |
| Sunflower seed flour (45% prot.) | 3 | 3 |
| Meat flour | 5 | 6 |
| Fish flour | 5 | 2 |
| Dehydrated alfalfa flour | 3 | 2 |
| Yellow corn gluten | 1 | 2 |
| Corn flour | 60 | 70 |
| Fat (°) | 2 | 2 |
| Calcium carbonate | 1 | 0.7 |
| Dicalcium phosphate | 1 | 0.4 |
| Sodium chloride | 0.5 | 0.4 |
| Vitamin and oligomineral complex (°°) | 0.5 | 0.5 |
| Total | 100.0 | 100.0 |

(°) Equal parts mixture of lard, bovine tallow, palm oil and cocoanut oil.
(°°) Composition:

| | | | |
|---|---|---|---|
| Vit.A | 2,500,000 I.U. | DL-methionine | 50,000 mg |
| Vit.D$_3$ | 400.000 I.U. | Mn | 20,000 mg |
| Vit.B$_1$ | 200 mg | Fe | 5,000 mg |
| Vit.B$_2$ | 1.000 mg | Zn | 5,000 mg |
| Vit.B$_6$ | 200 mg | Cu | 200 mg |
| Vit.B$_{12}$ | 3mg | I | 100 mg |
| Vit.PP | 4,500 mg | Co | 50 mg |
| Pantothenic acid | 1,000 mg | Vegetal support q.s. to | 1,000 g |
| Chlorine chloride | 100,000 mg | | |

TABLE 2

| | | 1.st period | 2.nd period |
|---|---|---|---|
| Humidity | % | 12.33 | 12.19 |
| Ashes | % | 4.98 | 4.72 |
| Raw protein | % | 23.51 | 20.38 |
| Raw fat | % | 5.12 | 5.40 |
| Raw fiber | % | 3.19 | 2.91 |
| Non-nitrogenous extracts | % | 50.87 | 54.40 |
| | | 100.00 | 100.00 |

Group 1 was considered as control group. Nifuroxazide was added to the feed of groups 2, 3, 4 in the ratio of 5, 10, 15 ppm respectively. The addition was effected in the form of a pre-mixture with lactose at the 0.5% concentration in order to favor the distribution uniformity in the feed.

The results obtained are summarized in Tables 3 and 4.

TABLE 3

| Group | Subjects No. | After 45 days Average live weight (g) | % weight increase with respect to Group 1 | Subjects No. | After 70 days Average live weight (g) | % weight increase with respect to Group 1 | Feed consumed (kg) in 70 days for each kg of live weight produced | Feed savings (%) |
| --- | --- | --- | --- | --- | --- | --- | --- | --- |
| (1) | (2) | (3) | (4) | (5) | (6) | (7) | (8) | (9) |
| 1 | 992 | 1171 | — | 972 | 1860 | — | 2.72 | — |
| 2 | 994 | 1160 | — | 980 | 1870 | — | 2.70 | 0.7% |
| 3 | 996 | 1229 | 4.93 | 981 | 2028 | 9.04 | 2.68 | 1.5% |
| 4 | 995 | 1240 | 5.87 | 989 | 2041 | 9.72 | 2.54 | 6.6% |

TABLE 4

| Group No. | % live weight | % carcass | % weight increase with respect to Group 1 |
| --- | --- | --- | --- |
| (1) | (2) | (3) | (4) |
| 1 | 66.0 | 51.6 | — |
| 2 | 66.2 | 51.8 | + 1.3% |
| 3 | 66.2 | 52.1 | + 10.6% |
| 4 | 66.3 | 53.2 | + 13.7% |

From Table 3 it appears that with the optimal dosage of 15 ppm of nifuroxazide (Group 4), at the end of the farming period an increase in weight of almost 10% with respect to the controls is attained with a more than 6% saving of feed.

Table 4 indicates the results concerning only the carcass of chicken after 70 days of farming. From column 2 it can be noted that the weight percentage represented by the carcass, increases only a little: 66.3% in Group 4 as compared with 66.0% of Group 1. However the data tabulated in columns (3) and (4) show that the meat content in the carcass of subjects of Groups 3 and 4 is increased by over 10% (13.7% in Group 4).

If desired the nifuroxazide content in the feed can be increased to 20 ppm and even up to 25 ppm, however the results attainable with these doses are not better than those tabulated from Group 4; therefore the recommendable dose is around 15 ppm.

GUINEA FOWL-FARMING

The test has been performed on 1,600 one-day old guinea fowl chickens of the Pearl Grey stock, all males and divided into four groups of 400 subjects each, indicated hereinafter by numerals from 1 to 4. The farming performed with the "on the ground" system in uniform surrounding conditions for all the subjects, lasted 100 days.

All animals have been fed in the first 40 days and in the subsequent 60 days respectively with two compounded integrated feeds, whose compositions are indicated in Table 5. The chemical analysis of the two feeds is indicated in Table 6.

TABLE 5

| Ingredients | 1.st period | 2.nd period |
| --- | --- | --- |
| Soy flour (50% prot.) | 10 | 9 |
| Peanut flour | 5 | 4 |
| Sunflower seed flour (45% prot.) | 3 | 3 |
| Meat flour | 4 | 4 |
| Fish flour | 4 | 2 |
| Dehydrated alphalpha flour | 3 | 3 |
| Corn flour | 60 | 70 |
| Barley flake flour | 5 | — |
| Yellow corn gluten | 1 | 1 |
| Dry distillery residue | 1 | 1 |
| Calcium carbonate | 1 | 0.7 |
| Dicalcium phosphate | 1 | 0.4 |
| Sodium chloride | 0.5 | 0.4 |
| Fat (°) | 1 | 1 |
| Vitamin (°°) and oligomineral complex | 0.5 | 0.5 |

(°) As in Table 1
(°°) As in Table 1, with the following differences:
  Vit.$B_{12}$  2 mg
  Chlorine Chloride  50,000 mg
  DL-methionine  30,000 mg
  Co  70 mg
  Mn  25.000 mg
  Zn  7,000 mg

TABLE 6

|  |  | 1.st Period | 2.nd Period |
| --- | --- | --- | --- |
| Humidity | % | 12.21 | 12.04 |
| Ashes | % | 5.38 | 4.92 |
| Raw protein | % | 22.14 | 19.96 |
| Raw fat | % | 4.38 | 4.49 |
| Raw fiber | % | 3.57 | 3.32 |
| Non-nitrogenous extracts | % | 52.32 | 55.27 |
|  | % | 100.00 | 100.00 |

Group 1 was considered as control group. Nifuroxazide was added to the feed of Groups 2,3 and 4 in the ratio of 10, 15 and 20 ppm respectively. The addition was effected in the form of a pre-mixture with lactose at 0.5% concentration in order to favor the distribution uniformity in the feed.

The results obtained are summarized in Tables 7 and 8. Column (7) of Table 7 shows that at the end of the farming, Group 4 showed a 10% weight increase with respect to the controls (Group 1); from the results tabulated within bracketts in column (8) it turns out that this increase is associated with a 4.3% saving of feed with respect to the controls.

Table 8 illustrates the data related only to the carcass. In this case also, as it can be seen from column (2), the percentage in weight represented by the carcass increases only a little. However the meat content in the subjects of groups 3 and 4 is increased over 10% (11.5 in Group 4). By increasing the dose of nifuroxazide to 25 ppm and even up to 30 ppm, no further improvement is obtained. Therefore the optimal dose for the guinea fowl is about 20 ppm.

TABLE 7

| Group | Subjects No. | After 70 days Average live weight (g) | Weight increase with respect to Group 1 | Subjects No. | After 100 days Average live weight (g) | Weight increase with respect to Group 1 | Feed consumed (kg) in 100 days for each kg of live weight produced |
| --- | --- | --- | --- | --- | --- | --- | --- |
| (1) | (2) | (3) | (4) | (5) | (6) | (7) | (8) |
| 1 | 392 | 1048 | — | 388 | 1254 | — | 3.95 (—) |

TABLE 7-continued

| | | After 70 days | | | After 100 days | | |
|---|---|---|---|---|---|---|---|
| (1) | (2) | (3) | (4) | (5) | (6) | (7) | (8) |
| Group | Subjects No. | Average live weight (g) | Weight increase with respect to Group 1 | Subjects No. | Average live weight (g) | Weight increase with respect to Group 1 | Feed consumed (kg) in 100 days for each kg of live weight produced |
| 2 | 394 | 1065 | + 1.6% | 392 | 1279 | + 2% | 3.91 (1%) |
| 3 | 396 | 1090 | + 4% | 395 | 1370 | + 9.3% | 3.80 (3.8%) |
| 4 | 396 | 1137 | + 8.5% | 396 | 1382 | + 10.2% | 3.78 4.3%) |

TABLE 8

| | | (Carcass) | |
|---|---|---|---|
| (1) | (2) | (3) | (4) |
| | | | Meat |
| Group n. | % live weight | % Carcass | % Weight increase with respect to Group 1 |
| 1 | 70.4 | 67.9 | — |
| 2 | 70.5 | 68.1 | + 2% |
| 3 | 70.7 | 68.4 | + 10.7% |
| 4 | 70.7 | 68.4 | + 11.5% |

TOXICOLOGICAL TESTS

A wide toxicological study on nifuroxazide has been performed at the Virology and Immunology Laboratory of the Pharmacy Faculty of Paris, France.

As regards the acute toxicity it has been demonstrated that 4 g/kg in the rats do not cause death and 8 g/kg kill only 30% of the animals. Besides it can be stated that this 30% mortality is not due to the furanic compound as such but to the mechanical action of the large amount of ingested substance.

In the determination of chronic toxicity, always in the rat, with a dose of 100 mg/kg per day of nifuroxazide for a period of 20 days it has not been possible to detect at the necroscopic examination either macroscopical or histological lesions.

Besides, nifuroxazide administered daily for 6 months to "Rhesus" monkeys and to "Wistar" rats at the dose of 10-250-1000 mg/kg has not shown any toxicity symptom.

A toxicologic study on chickens and rabbits has been performed at the Institute of General Pathology and Veterinary Pathologic Anatomy of Turin, Italy.

As regards the acute toxicity, none of the chickens treated with a 2 g/kg dose of nifuroxazide died, the necroscopic examination has not detected macroscopic or histological lesions.

No cases of death occurred even in the chronic toxicity tests performed for 4 months and for 6 months by administration with the feed in a dosage respectively 15 times and 16 times greater than the therapeutical one.

The residue control tests performed on the organs of chickens treated for 5 days with 10 and 20 mg/kg per day respectively of nifuroxazide (therapeutical- and twice the therapeutical dose) showed negative results.

On the acute toxicity tests performed on rabbits of the New Zealand stock, probed for 4 days with 5 g/kg of nifuroxazide, all the subjects survived without displaying any particular symptomatology.

Besides, administration of nifuroxazide incorporated in the ratio of 1% in the diet of rabbits of the white neozealandese stock for the duration of 3 months did not cause occurrence of any particular symptomatology.

The hematological and hematochemical examinations of the percentage weight of the organs and the necroscopic and anatomopathological examination, did not detect any particular related to the treatment.

TERATOGENETICAL TESTS

This study was performed at the Consultox Laboratories of London on 90 rabbits of the Dutch Belted stock and on 150 mice of the Charles River stock.

Nifuroxazide administered to rabbits from the 6.th to the 18.th day of pregnancy at the dose of 250-500-1,000 mg/kg and to mice from the 6.th to the 15.th day of pregnancy at the dose of 500-1,000-2,000 mg/kg did not exhibit any teratogenous activity.

PHARMACOKINETICAL STUDY

This study was performed at the Pharmacy Faculty of Paris, France, by the following methodologies:

determination of nifuroxazide in the intestine after a certain period from its administration, sufficient to allow its passage into the blood, determination in the blood at different time intervals from the administration.

The first experiment consists of introducing into the small intestine of anesthesized rat an exact amount of nifuroxazide, through a small incision at the duodenum region. After a certain period of time (5 hours), in relation to the normal duration of the intestinal transit, the amount remaining in the intestine is determined.

Having treated 5 animals in the hereinbefore mentioned way the following results have been obtained:

| Amount of nifuroxazide | | |
|---|---|---|
| Administered | Found | % found |
| 66 mg | 67 mg | 101.3 |
| 67 mg | 64 mg | 95.5 |
| 52.5 mg | 50 mg | 95.2 |
| 65 mg | 66.5 mg | 102.2 |
| 62 mg | 64 mg | 103 |
| Average 62.5 mg | 62.3 mg | 99.4 |

The results show that, taking into account any errors made during the experiment and the sensitivity of the method, practically all the nifuroxazide which has been introduced is found again in the intestine, even after 5 hours.

Rats weighing 150-180 g treated with 1 ml of a 10% suspension of nifuroxazide (100 mg) have been used for the search of nifuroxazide in the blood; blood samples were taken from the rats 1 hr, 2 hrs and 3 hrs after administration of the compound. Notwithstanding this maximum dosage, it has not been possible to evidence the presence of nifuroxazide in the blood of these animals by a method which allow detection of a concentration as low as 1 μg/ml.

Further experiments performed on the blood of dogs treated orally with massive doses of nifuroxazide (200 mg/kg), as well as on the blood of subjects treated with doses slightly greater than the usual therapeutical doses, have given negative results, eventhough the analytical method allowed detection of a hematical concentration of nifuroxazide of 0.4 mg/ml.

Nifuroxazide kinetics is therefore limited to an intestinal transit with no absorption.

I claim:

1. A method for promoting the growth rate of broilers and guinea fowl meat poultry, comprising feeding healthy poultry with a feed containing from 10 to 25 ppm of nifuroxazide.

2. The method according to claim 1 wherein broilers are fed 15 ppm of nifuroxazide.

3. The method according to claim 1 wherein guinea fowl are fed 20 ppm of nifuroxazide.

4. A feed for promoting the growth rate of broilers and guinea fowl meat poultry which comprises 10 to 25 ppm of nifuroxazide uniformly dispersed on said feed.

5. The feed according to claim 4 wherein the amount of nifuroxazide is 15 ppm.

6. The feed according to claim 4 wherein the amount of nifuroxazide is 20 ppm.